United States Patent
O'Connor

[15] 3,677,509
[45] July 18, 1972

[54] TIEDOWN DEVICE

[72] Inventor: Chadwell O'Connor, 3490 E. Foothill Boulevard, Pasadena, Calif. 91107

[22] Filed: Aug. 31, 1970

[21] Appl. No.: 68,342

[52] U.S. Cl..................................248/187, 85/32, 151/24
[51] Int. Cl.................................................F16m 11/08
[58] Field of Search...............248/11, 178, 179, 183, 186, 248/187, 349; 269/84

[56] References Cited

UNITED STATES PATENTS 2,719,690 10/1955 Zucker....................................248/183
3,163,387 12/1964 Thomas...................................248/183

*Primary Examiner*—William H. Schultz
*Attorney*—Wolfe, Hubbard, Leydig, Voit & Osann, Ltd.

[57] ABSTRACT

A lever operated locking device suitable for a camera-panhead assembly in which a manually rotatable camera tiedown screw is supplemented by a bushing and locking lever interposed between the screwhead and the tripod mounting plate. Conical, mating clutch surfaces are provided between the screwhead and the bushing so that during loose engagement of a camera the screwhead may be easily turned independently of the locking lever, with final tight locking or unlocking movement being accomplished by moving the locking lever through a small arc.

4 Claims, 3 Drawing Figures

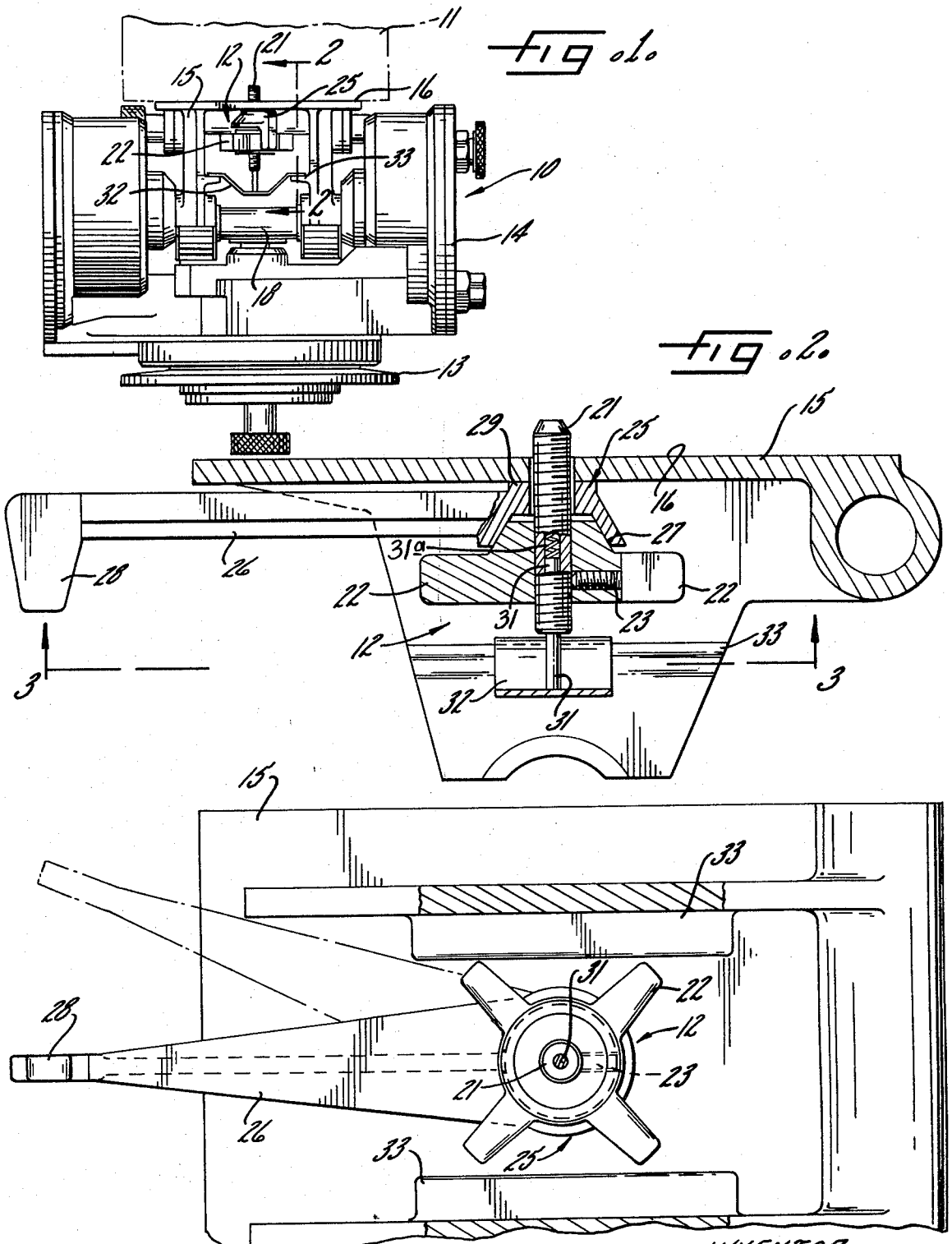

TIEDOWN DEVICE

DESCRIPTION OF THE INVENTION

This invention relates to clamping devices, and in particular to a lever operated tiedown device particularly adapted for use with instrument panheads.

Optical instruments such as cameras, particularly movie cameras, are often mounted on panheads providing controlled positioning and movement of the instrument with the panhead, in turn, being secured to a tripod, boom or other supporting structure. To secure a device such as a camera to a panhead, it is conventional to form the panhead with a mounting plate on which the camera rests and to provide a tiedown screw which extends up through the plate and into a correspondingly threaded hole in the camera. By rotating the screw, the camera is drawn and held against the plate. A typical panhead of this type is shown in my U.S. Pat. No. 2,998,953, issued Sept. 5, 1961.

With heavy instruments, such as a professional movie camera, considerable hold-down force must be exerted to keep the camera from skewing on the mounting plate as it is tilted and panned. While the tiedown screwhead can be made larger to increase the mechanical advantage of manually tightening the screw, most panheads physically limit the possible size of the screwhead. It is not desirable to rotate the camera for final screw tightening purposes since the lens axis must remain properly oriented with the panning and tilting axes of the head.

Accordingly, it is the primary aim of the invention to provide a simple, fast-acting and economical tiedown device which greatly increases the mechanical advantage for manually securing an instrument to a mounting plate within strict space limitations.

More specifically, it is an object of the invention to provide a device of the above character which permits forceful final tightening, and initial loosening, of a tiedown screw where movement is limited and without the use of gearing, special tools or other costly and inconvenient equipment.

Other objects and advantages of the invention will become apparent upon reading the following detailed description and upon reference to the drawings, in which:

FIG. 1 is a side elevation of a panhead equipped with a tiedown device embodying the invention;

FIG. 2 is an enlarged fragmentary section taken approximately along the line 2—2 of FIG. 1; and FIG. 3 is a fragmentary section taken along the line 3—3 of FIG. 2.

While the invention will be described in connection with a preferred embodiment, it will be understood that I do not intend to limit the invention to that embodiment. On the contrary, I intend to cover all alternatives, modifications and equivalents as may be included within the spirit and scope of the invention.

Turning first to FIG. 1, there is shown a panhead 10 having a structure 11, such as a camera, mounted on the panhead by a tiedown device 12 embodying the invention. The panhead 10 includes a base 13, on which a housing 14 rotates about a vertical panning axis, and a mounting plate 15 secured to a shaft 18 that rotates in the housing 14 about a horizontal tilting axis. The top of the mounting plate 15 defines a flat mounting surface 16 against which the structure 10 is held by the device 12.

The device 12 includes a rotary member 21, having a camming surface, extending from the mounting surface 16 so as to be engageable with a mating camming surface on the mounted structure 11. In the illustrated embodiment, the member 21 is a threaded stud, whose threads define the camming surface, which is adapted to threadably engage a tapped hole in the structure 11 and thus cam, or draw, the structure 11 tightly against the surface 16. To rotate the member 21, the member has a fluted head 22 secured by a set screw 23 to the member 21 beneath the plate 15. The diameter of the head 22, and hence the mechanical advantage upon manually turning the head, is limited by the clearances within the structure of the panhead 10.

In accordance with the invention, a locking bushing 25 with a lever arm 26 is interposed between the plate 15 and the head 22, and interengaging friction-producing clutching surfaces 27 are formed on the head and the bushing so that, after the member 21 is engaged with the structure 11 and initially tightened, manual swinging of the lever 26 will further turn the member 21 and tightly secure the structure 11 against the mounting surface 16. Preferably, the clutching surfaces 27 are mating, convex and concave, conical surfaces, with the latter being formed in the bushing 25 and the former formed on the head 22. The illustrated arrangement also includes a pressure flange 28 at the outer end of the lever 26. A small annular surface 29 on the bushing 25 bears against the lower surface of the mounting plate 15.

It can be seen that the mating conical surfaces 27 act as a cone clutch which, after the head 22 is initially rotated drawing the member 21 up into the structure 11, develops sufficient force to permit swinging movement of the lever to further tighten the member 21.

As a feature of the invention, the member 21 is resiliently supported so as to be depressible beneath the surface 16 prior to being threaded into the mounting hole in the structure 11. For this purpose, a pin 31 is fitted into a hole in the lower end of the member 21 against a compressed coil spring 31a held captive in the hold. The lower end of the pin 31 rests against a support strap 32 whose opposite ends ride on flanges 33 formed on the mounting plate 15. Preferably, the strap 32 simply rests on the flanges 33, held by the light spring force exerted through the pin 31.

The use or operation of the tiedown device 25 can now be readily seen. With the panhead 10 "locked," the structure 11 is rested upon the surface 16. The resilient mounting for the member 21 allows it to be pushed beneath the surface 16 — the member 21 moving down on the pin 31. The structure 11 is then shifted into proper position with its tapped hole alined with the member 21. The bias on the member 21 urges it upwardly and the head 22 is manually rotated so as to threadably engage the member 21 into the tapped hole, thus camming the structure 11 against the plate 15. Once initially tightened, the pressure flange 28 of the lever 26 is engaged and the lever rotated through a short arc so as to provide a forceful final tightening of the member 21. It has been found that satisfactory results with quite heavy structures are obtained by movement of the lever through an arc on the order of 10°.

When it is desired to remove the structure 11 from the panhead 10, the lever 26 is swung in the untightening direction to provide initial loosening of the member 21 within its mating threaded hole. Upon being loosened, complete disengagement of the member 21 from the structure 11 is effectuated by manually turning the head 22.

Those familiar with this art will appreciate that the tiedown device 25 is particularly simple and economical to manufacture. Obviously, no gearing, special tools or other costly or inconvenient equipment are brought into play upon use of the device.

I claim as my invention:

1. A tiedown device comprising, in combination, a plate defining a mounting surface, a rotatable member having a camming surface extending from said mounting surface so as to be engageable upon rotation with a mating camming surface on a structure to be secured to said mounting surface, said member having a head to facilitate manual rotation of said member and resulting camming engagement, a locking bushing interposed between said plate and said head, said bushing and said head having interengaging friction producing clutching surfaces, and a lever arm on said bushing so that, upon engaging said camming surfaces by manual rotation of said head, manual swinging of said lever will further turn said member and tightly secure the structure against said mounting surface.

2. The combination of claim 1 in which said member is a threaded stud whose threads define said camming surface.

3. The combination of claim 2 in which said stud is resiliently supported so as to be depressible beneath said surface prior to camming engagement with said structure.

4. The combination of claim 1 to which said clutching surfaces are mating convex and concave surfaces formed on the head and the bushing.

* * * * *